US012792938B1

(12) United States Patent
Blyth

(10) Patent No.: US 12,792,938 B1
(45) **Date of Patent: *Nov. 10, 2026**

(54) DETERMINISTIC CONTROL OF PROBABILISTIC INFERENCE USING NON-SEMANTIC EXECUTION BEHAVIOR

(71) Applicant: Sean Blyth, Bainbridge Island, WA (US)

(72) Inventor: Sean Blyth, Bainbridge Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/556,945

(22) Filed: Mar. 4, 2026

Related U.S. Application Data

(63) Continuation of application No. 19/533,229, filed on Feb. 8, 2026.

(60) Provisional application No. 63/976,055, filed on Feb. 4, 2026.

(51) Int. Cl.
*G06F 9/46* (2006.01)
*G06F 9/48* (2006.01)
*G06N 5/046* (2023.01)
*G06N 7/01* (2023.01)

(52) U.S. Cl.
CPC ............ *G06N 5/046* (2013.01); *G06F 9/485* (2013.01); *G06N 7/01* (2023.01)

(58) Field of Classification Search
None
See application file for complete search history.

(56) References Cited

U.S. PATENT DOCUMENTS

| | | | | |
|---|---|---|---|---|
| 7,882,216 | B2 * | 2/2011 | Houlihan | G06F 9/4856 709/215 |
| 10,853,178 | B1 * | 12/2020 | Pan | G06F 11/3055 |
| 2015/0066826 | A1 * | 3/2015 | Canoy | G06N 3/10 706/15 |

FOREIGN PATENT DOCUMENTS

| | | | | |
|---|---|---|---|---|
| GB | 2639747 A | * | 10/2025 | H04L 41/16 |

* cited by examiner

*Primary Examiner* — Bing Zhao

(57) ABSTRACT

Systems and methods are disclosed for deterministically terminating adversarial inference execution using non-semantic execution behavior. A deterministic controller governs execution of probabilistic inference processes across multiple execution rounds and computes quantitative behavioral signals derived from machine-observable execution telemetry. Stabilization of the signals across a persistence window triggers deterministic termination independent of semantic agreement, correctness, or confidence of inference outputs. Upon termination, the system persists a decision-space artifact sufficient to support replay and audit of the termination decision without re-executing inference. The disclosed systems improve computer operation by enforcing bounded, reproducible execution behavior in stochastic inference workflows.

30 Claims, 4 Drawing Sheets

FIG. 1 — SYSTEM ARCHITECTURE DIAGRAM
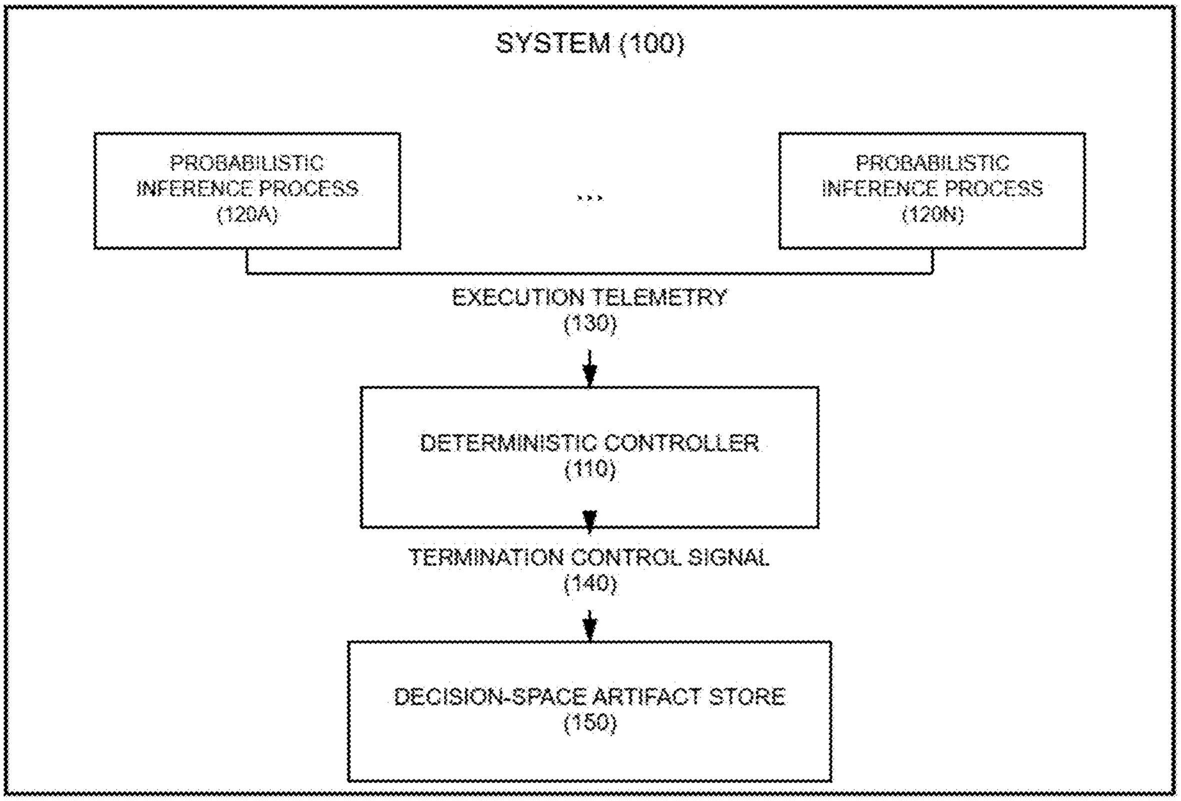

FIG. 2 — DETERMINISTIC CONTROLLER STATE MACHINE
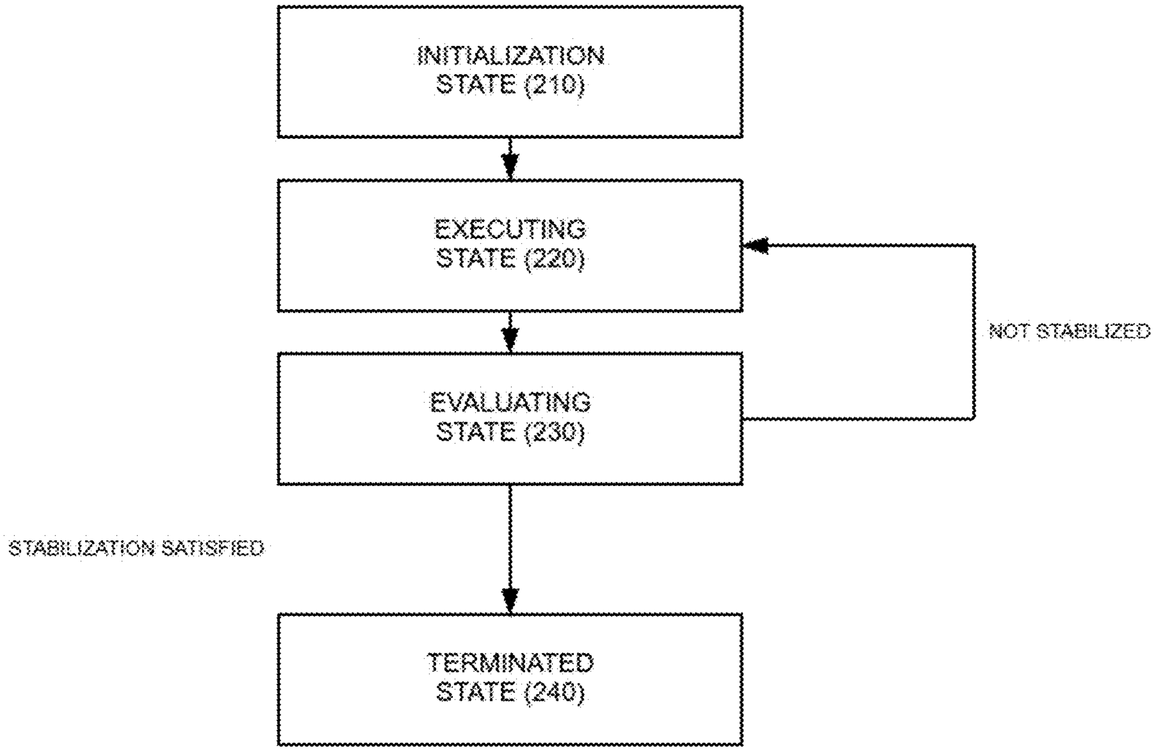

FIG. 3 — EXECUTION-ROUND SIGNAL AGGREGATION
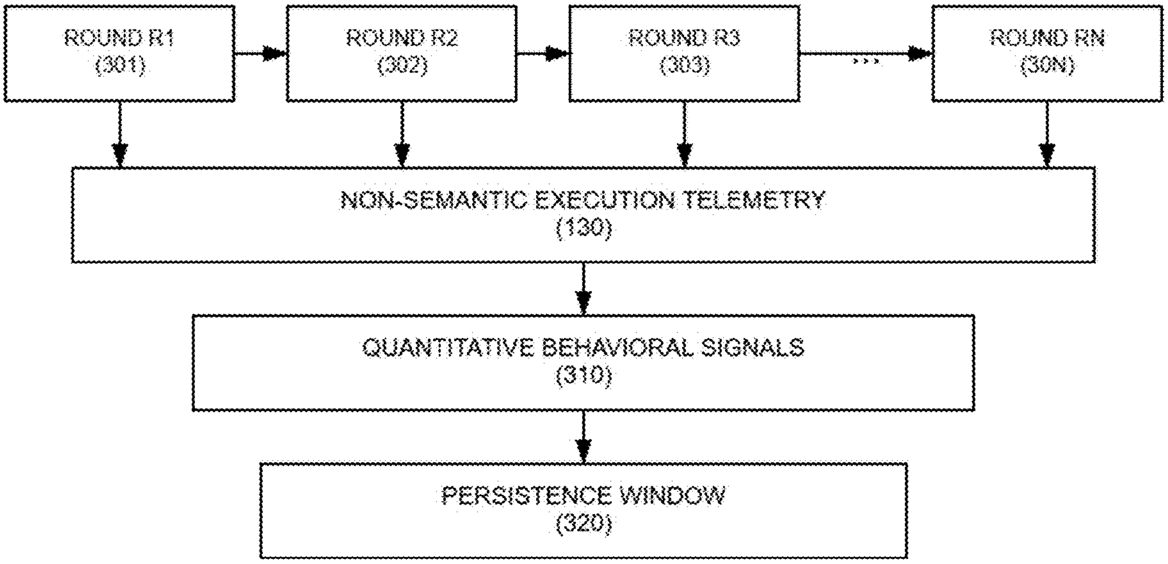

FIG. 4 — TERMINATION AND ARTIFACT PERSISTENCE FLOW
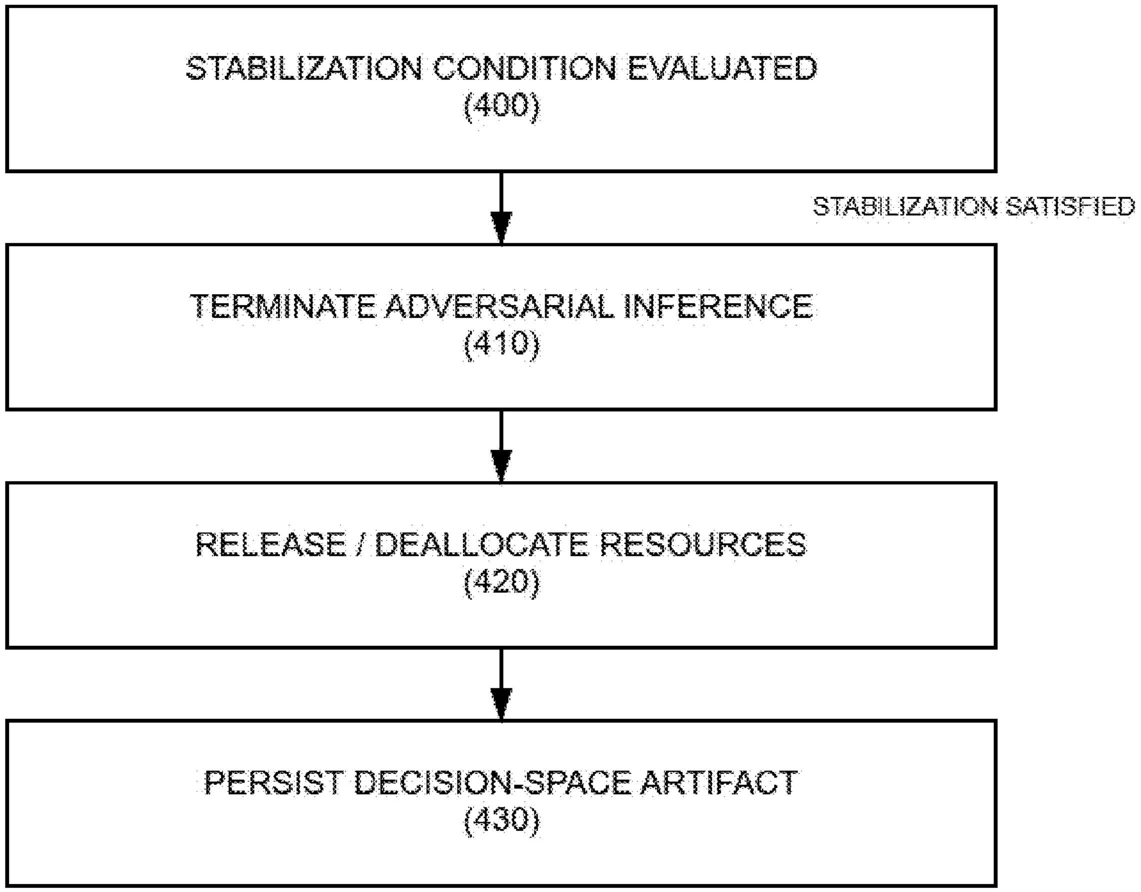

DETERMINISTIC CONTROL OF PROBABILISTIC INFERENCE USING NON-SEMANTIC EXECUTION BEHAVIOR

CROSS-REFERENCE TO RELATED APPLICATIONS

This application is a continuation of U.S. patent application Ser. No. 19/533,229, filed Feb. 8, 2026, entitled "Deterministic Termination and Governance of Adversarial Inference Processes," which claims priority to U.S. Provisional Application No. 63/976,055, filed Feb. 4, 2026, entitled "Deterministic Termination and Governance of Adversarial Inference Processes," the entire contents of each of which are incorporated herein by reference for all purposes.

STATEMENT REGARDING FEDERALLY SPONSORED RESEARCH

Not applicable.

REFERENCE TO SEQUENCE LISTING

Not applicable.

FIELD OF THE INVENTION

The present invention relates to computer-implemented systems for governing execution of probabilistic inference processes. More particularly, the invention relates to deterministic control of adversarial or multi-agent inference workflows using non-semantic execution behavior to enforce bounded, replayable, and auditable termination of execution.

BACKGROUND OF THE INVENTION

Probabilistic and generative artificial intelligence systems increasingly employ adversarial, multi-agent, or role-differentiated inference processes—including debate, red-teaming, structured disagreement, and constraint opposition—to surface failure modes and stress system behavior. Such processes are frequently iterative, adaptive, and non-deterministic by design.

Existing systems typically terminate adversarial inference execution using elapsed time limits, fixed iteration counts, resource exhaustion, semantic agreement, confidence thresholds, or manual human intervention. These approaches suffer from material technical limitations. In particular, termination decisions are not reproducible across executions, depend on semantic interpretation of inference outputs, and do not yield auditable or replayable termination artifacts.

Moreover, conventional termination mechanisms do not directly govern processor execution flow. Instead, they operate as advisory or supervisory signals layered atop stochastic inference engines, leaving execution growth, scheduling, and downstream autonomy susceptible to nondeterministic variation. Such limitations are especially problematic in regulated, safety-critical, or autonomous environments requiring deterministic governance of execution behavior.

Accordingly, there exists a need for a deterministic execution-governance mechanism that terminates adversarial inference processes independent of semantic evaluation, while producing bounded, replayable, and auditable execution outcomes.

SUMMARY OF THE INVENTION

The disclosed systems and methods provide a deterministic control plane that governs termination of adversarial inference execution based on stabilization of non-semantic execution behavior observed across multiple execution rounds.

In one embodiment, a deterministic controller observes machine-observable execution behavior emitted during adversarial inference, computes quantitative behavioral signals derived exclusively from such execution behavior, evaluates stabilization of those signals across a persistence window of consecutive execution rounds, and deterministically terminates execution when the stabilization condition is satisfied.

Termination decisions may be determined by controller state transitions and are independent of semantic agreement, correctness, confidence, probability estimates, or likelihood of inference outputs. The deterministic controller directly governs processor execution, scheduling, and resource allocation such that termination alters subsequent machine operation rather than merely producing advisory information.

Upon termination, the system persists a decision-space artifact comprising execution-round identifiers, behavioral signal values, controller state transitions, and a terminal outcome. The artifact supports deterministic replay and audit of the termination decision without re-executing inference.

BRIEF DESCRIPTION OF THE DRAWINGS

FIG. 1 is a block diagram of an example computer-implemented system for deterministic governance and termination of an adversarial inference process, including a deterministic controller, one or more inference agents, a signal capture layer, and an artifact persistence layer.

FIG. 2 is a flow diagram illustrating an example deterministic control procedure in which the deterministic controller schedules execution rounds, collects quantitative behavioral signals, evaluates stabilization over a persistence window under fixed deterministic evaluation rules, and terminates the adversarial inference process upon satisfaction of stabilization conditions.

FIG. 3 is a diagram illustrating example quantitative behavioral signals and example deterministic aggregation of such signals across multiple execution rounds to determine persistence, stabilization, and termination conditions.

FIG. 4 is a flow diagram illustrating example generation and persistence of replayable decision-space artifacts, including at least the input context, execution perturbations, quantitative behavioral signals, termination predicates, and outputs produced by the adversarial inference process.

DETAILED DESCRIPTION OF THE INVENTION

Definitions

For purposes of this disclosure:

Deterministic controller means an execution-governing component whose state transitions are deterministic functions of prior state and observed execution-level signals.

Non-semantic execution behavior means machine-observable execution characteristics excluding semantic content, output text, embeddings, confidence scores, or probability estimates.

Quantitative behavioral signal means a numerical or categorical measure derived exclusively from non-semantic execution behavior.

Execution round means a discrete invocation or cycle of adversarial inference execution.

Stabilization means persistence or bounded invariance of quantitative behavioral signals across a predetermined number of consecutive execution rounds.

Persistence window means the predetermined number of consecutive execution rounds over which stabilization is evaluated.

Decision-space artifact means a persisted representation sufficient to deterministically reproduce a termination decision without re-executing inference.

System Architecture Overview

As shown in FIG. 1, the system (100) may comprise a deterministic controller (110) operatively coupled to one or more probabilistic inference processes (120A-120N). During execution of adversarial inference across multiple execution rounds, the inference processes emit non-semantic execution telemetry (130) reflecting machine-observable execution behavior. The deterministic controller (110) receives the execution telemetry (130), computes quantitative behavioral signals, and produces termination control signals (140) that directly govern execution progression. Upon termination, a decision-space artifact store (150) persists execution-round identifiers, quantitative behavioral signal values, controller state transitions, and a terminal outcome.

Deterministic Controller State Machine

Referring to FIG. 2, the deterministic controller (110) operates as a deterministic state machine (200) comprising an initialization state (210), an executing state (220), an evaluating state (230), and a terminated state (240). State transitions are deterministic functions of prior controller state and stored quantitative behavioral signals. When stabilization is not satisfied, the controller transitions from the evaluating state (230) back to the executing state (220). When stabilization is satisfied, the controller transitions to the terminated state (240), preventing further execution.

Execution-Round Signal Aggregation

As illustrated in FIG. 3, execution proceeds across multiple execution rounds (R1-RN). Non-semantic execution telemetry (130) is observed for each execution round and aggregated to derive one or more quantitative behavioral signals (310). The quantitative behavioral signals are evaluated over a persistence window (320) to determine whether stabilization conditions are satisfied.

Termination and Artifact Persistence Flow

As shown in FIG. 4, upon satisfaction of the stabilization condition, the deterministic controller terminates adversarial inference execution, releases or deallocates computing resources, and persists a decision-space artifact. The persisted artifact supports deterministic replay and audit of the termination decision without re-executing inference.

Adversarial Inference Execution

An adversarial inference process may comprise multiple inference models or multiple executions of a single inference model operating under adversarially differentiated roles, objectives, or constraints. Execution proceeds across a plurality of execution rounds.

Non-Semantic Execution Behavior

During each execution round, the system observes non-semantic execution behavior including execution timing, control-flow variation, retry behavior, branching behavior, execution variance across rounds, resource utilization, and tool-invocation structure. Non-semantic execution behavior expressly excludes semantic content, embeddings, confidence scores, probability estimates, or any derivative thereof.

Non-semantic execution behavior may further include other machine-observable execution characteristics that reflect execution dynamics without regard to semantic content, including characteristics not enumerated herein.

Quantitative Behavioral Signals

The deterministic controller computes one or more quantitative behavioral signals derived exclusively from observed non-semantic execution behavior. These signals are measured independently of inference output meaning or correctness.

Stabilization Evaluation

Stabilization is evaluated based on relative change, bounded invariance, or persistence of quantitative behavioral signals across a persistence window. Stabilization does not require convergence, agreement, correctness, or resolution of semantic disagreement, and may include bounded oscillation or persistent incompatibility.

In all implementations, evaluation of the stabilization condition is performed by applying predetermined, deterministic rules to stored quantitative behavioral signal values derived from execution telemetry. The deterministic rules and bounded conditions are fixed prior to execution of the adversarial inference process and are applied consistently across execution rounds, such that identical signal values evaluated under identical rules yield identical stabilization outcomes.

In some implementations, predetermined bounded conditions used to evaluate the stabilization condition are stored as configuration parameters accessible to the deterministic controller prior to execution of the adversarial inference process and remain fixed throughout execution without adaptive modification or runtime learning.

Illustrative Stabilization Signal Implementations (Non-Limiting)

In some non-limiting implementations, quantitative behavioral signals may be derived from execution telemetry in the form of deterministic measures computed from machine-observable execution behavior. By way of example only, such signals may include one or more of the following:

1. a normalized retry-rate variance computed across consecutive execution rounds based on observed retry counts or failure recoveries;
2. a measure of control-flow or tool-invocation structure change computed as a normalized difference between execution graphs or invocation paths observed in successive execution rounds; and
3. a bounded measure of execution-timing dispersion or execution-variance entropy computed from observed timing telemetry across execution rounds.

In such implementations, stabilization may be detected when one or more of the foregoing quantitative behavioral signals remains within predetermined bounded conditions across a persistence window of execution rounds, as determined by applying deterministic rules to stored signal values. These examples are illustrative only, and no particular signal type, computation method, or stabilization test is required.

Conventional Termination Approaches and Technical Limitations

Conventional adversarial and multi-agent inference systems typically evaluate termination based on semantic properties of inference outputs, including semantic agreement, similarity, confidence estimates, probability scores, or synthesized consensus results. Such approaches assume that semantic convergence or increasing confidence indicates completion of useful inference.

These systems therefore direct engineering effort toward interpreting output content, estimating correctness, or aggregating semantic conclusions, rather than governing execution behavior of the inference process itself. As a result, termination mechanisms are commonly implemented as advisory or supervisory layers that do not deterministically control processor execution flow and are not reproducible across executions.

In contrast, the systems and methods disclosed herein deliberately avoid semantic evaluation of inference outputs and instead govern termination based on stabilization of non-semantic execution behavior observed across repeated execution rounds. This approach departs from conventional design assumptions by treating execution behavior, rather than output content, as the controlling signal for deterministic termination.

In this respect, the disclosed systems invert conventional optimization objectives by treating stabilization of execution behavior—rather than improvement, convergence, or agreement of inference outputs—as the terminating condition for execution.

Conventional inference and optimization systems are designed to continue execution so long as outputs change or improve, and to treat stabilization as an indication of success or convergence. By contrast, the disclosed systems treat stabilization of execution behavior—including persistent disagreement or bounded oscillation—as an indication that further execution is unlikely to yield additional structural information, and therefore deterministically terminate execution regardless of output quality.

Conventional adversarial and optimization systems therefore teach continuation of execution in response to output change or instability, and teach away from terminating execution in the presence of persistent disagreement or bounded oscillation, which are treated as conditions requiring further computation.

Example Implementation (Non-Limiting)

In one non-limiting implementation, the deterministic controller observes execution timing variance and control-flow variation emitted during repeated execution of an adversarial inference process across multiple execution rounds. For each execution round, the controller derives a quantitative behavioral signal representing relative change in execution behavior with respect to one or more prior rounds.

In this implementation, stabilization may be detected when the quantitative behavioral signal remains within a bounded range across a predetermined number of consecutive execution rounds defining a persistence window. Upon detection of such stabilization, the deterministic controller transitions to a terminal state and terminates further execution of the adversarial inference process, independent of semantic agreement, correctness, confidence, or probability estimation of inference outputs.

The foregoing example is provided for purposes of illustration only. Other quantitative behavioral signals, bounded conditions, and persistence windows may be employed without departing from the scope of the invention, and no particular signal type, threshold, or number of execution rounds is required.

Deterministic Controller and State Machine

The deterministic controller may operate as a deterministic state machine comprising, in one embodiment, initialization, executing, evaluating, and terminated states. State transitions are deterministic functions of prior controller state and stored quantitative behavioral signals. Identical signals and identical prior states yield identical termination outcomes.

Deterministic Termination and Execution Control

When the stabilization condition is satisfied, the deterministic controller transitions to a terminal state and terminates further execution. Termination prevents issuance of additional inference invocations, deallocates compute resources, and alters downstream execution flow. Omission of the quantitative behavioral signals would result in materially different processor execution behavior.

In some implementations, the deterministic controller is positioned within the execution dispatch path of the computing system such that termination directly prevents further scheduling, invocation, or tool execution by one or more processors. In this configuration, the deterministic controller enforces termination by inhibiting issuance of additional inference invocations, releasing reserved execution resources, and preventing downstream execution actions at the system level rather than merely generating advisory termination signals.

Decision-Space Artifact

Upon termination, the system persists a decision-space artifact comprising execution-round identifiers, behavioral signal values, controller state transitions, and a terminal outcome. The artifact supports deterministic replay and audit without re-execution.

In some implementations, the decision-space artifact may include representations of differences, compatibilities, or persistence among outputs generated in different execution rounds. Such representations are stored solely as part of the persisted artifact for purposes of replay, audit, or inspection and are not used as inputs to stabilization evaluation or termination decisions, which remain governed exclusively by non-semantic execution behavior.

Negative Limitations

The deterministic controller does not rely on semantic similarity, embeddings, confidence scoring, probability estimation, learned stopping policies, or probabilistic termination heuristics during execution.

System Implementation

The systems and methods described herein may be implemented using one or more computing systems comprising one or more processors and one or more memory devices storing executable instructions. The processors may include general-purpose processors, special-purpose processors, or combinations thereof, and may be implemented in a single computing device or distributed across multiple computing devices.

In some implementations, the deterministic controller and adversarial inference processes are executed on one or more servers, virtual machines, containers, or other computing environments, including cloud-based, on-premises, or hybrid deployments. The memory devices may include volatile or non-volatile memory storing execution telemetry, quantitative behavioral signals, controller state information, and decision-space artifacts.

Execution of the deterministic controller directly governs processor execution flow by enabling, disabling, or terminating inference execution based on observed execution behavior, thereby improving operation of the computing system by deterministically constraining execution growth and resource consumption in probabilistic inference workflows while enforcing bounded, deterministic execution of probabilistic inference processes.

In some implementations, predetermined bounded conditions used to evaluate the stabilization condition are stored as configuration parameters prior to execution of the adversarial inference process and remain fixed during execution.

IMPLEMENTATION VARIANTS

The disclosed systems may be implemented using single-model or multi-model adversarial inference, tool-calling or non-tool-calling architectures, and cloud, on-premises, or embedded deployments. All variants share the same deterministic termination principle.

The invention claimed is:

1. A computer-implemented system, comprising:

one or more processors;

memory storing executable instructions; and a deterministic controller implemented as a deterministic state machine, the deterministic controller comprising logic executable by the one or more processors, and integrated within or operatively coupled to an execution dispatch path that issues, schedules, queues, routes, or initiates processor execution commands for inference invocations or tool executions, including a scheduling, task-queue, invocation-routing, or execution-management component such that execution commands associated with one or more probabilistic inference processes cannot be issued without authorization by the deterministic controller prior to issuance, and wherein the deterministic controller produces termination control signals and controller state transitions that directly govern execution progression such that, upon satisfaction of a termination condition, the deterministic controller enforces termination by inhibiting issuance of additional inference invocations and directly preventing further scheduling, invocation, or tool execution at the execution dispatch path rather than merely generating advisory termination signals, and wherein issuance of execution commands is denied at the execution dispatch path upon satisfaction of the termination condition such that scheduling or invocation of additional inference invocations is prevented;

wherein execution of the executable instructions by the one or more processors causes the system to:

(a) initiate scheduling of one or more probabilistic inference processes configured to execute across a plurality of execution rounds including two or more temporally distinct execution rounds in response to an input context;

(b) observe machine-observable execution telemetry comprising machine-observable execution characteristics including execution timing, control-flow variation, retry behavior, branching behavior, execution variance across execution rounds, resource utilization of the one or more probabilistic inference processes, or tool-invocation structure generated during execution of the probabilistic inference processes, the machine-observable execution characteristics being independent of semantic content of inference outputs;

(c) compute, by the deterministic controller and without interpreting semantic content of inference outputs, one or more quantitative behavioral signals, each comprising a numerical or categorical measure derived exclusively from the machine-observable execution telemetry, wherein the numerical or categorical measure comprises one or more of: (i) an aggregate statistic across the execution rounds; (ii) a normalized difference between execution-round observations; (iii) a structural measure of control-flow or tool-invocation variation across execution rounds; or (iv) any other deterministic measure or direct measurement derived exclusively from the machine-observable execution telemetry observed during one or more of the execution rounds;

(d) evaluate, using predetermined deterministic evaluation rules established prior to execution of the probabilistic inference processes and applied consistently across execution rounds, the predetermined deterministic evaluation rules comprising static configuration data remaining fixed for a duration of processing the input context and not updated, retrained, or modified during execution of the probabilistic inference processes for the input context, whether the termination condition is satisfied based solely on the quantitative behavioral signals, wherein satisfaction of the termination condition is determined by controller state transitions derived from the quantitative behavioral signals evaluated under the predetermined deterministic evaluation rules and is a sufficient controlling predicate for a transition of the deterministic controller to the terminal state and inhibiting issuance of additional execution commands, and update a deterministic controller state as a deterministic function of the quantitative behavioral signals across the execution rounds, wherein the deterministic controller state controls whether execution commands are permitted for continued execution or termination of the probabilistic inference processes for the input context;

(e) upon satisfaction of the termination condition, transition the deterministic controller to the terminal state and directly inhibit issuance of additional execution commands by denying, at the execution dispatch path, scheduling, invocation, or execution of additional execution commands that would otherwise schedule, invoke, or execute further probabilistic inference processes or associated tool operations, wherein inhibition occurs without requiring evaluation, acceptance, or execution by the probabilistic inference processes as a prerequisite to inhibition, and wherein inhibition of issuance of additional execution commands is performed in response to the deterministic controller state transition or a deterministic controller state indicating inhibition and not in response to an independent termination determination performed by the scheduling, task-queue, invocation-routing, or execution-management component;

(f) in response to satisfaction of the termination condition, release or deallocate computing resources allocated for subsequent execution rounds of the probabilistic inference processes;

wherein:

(i) suppression of additional execution commands alters processor execution flow rather than generating advisory termination information;

(ii) identical quantitative behavioral signals evaluated under identical predetermined deterministic evaluation rules yield identical termination outcomes independent of stochastic variation within the probabilistic inference processes, and identical quantitative behavioral signals evaluated under identical predetermined deterministic evaluation rules and identical prior deterministic controller states yield identical subsequent deterministic controller states and identical termination outcomes; and (iii) determination of the termination condition is independent of semantic agreement, semantic convergence, probabilistic confidence, correctness evaluation, or model-generated judgments regarding sufficiency of inference outputs;

(iv) a stabilization condition based on persistence or bounded invariance of the quantitative behavioral signals within predetermined bounded conditions, the predetermined bounded conditions being stored as configuration parameters prior to execution, across a persistence window is treated as a sufficient terminating condition independent of improvement, convergence, agreement, or correctness of inference outputs, wherein the stabilization condition indicates, under the predetermined deterministic evaluation rules, that execution behavior has stabilized within the predetermined bounded conditions, and wherein the termination condition requires persistence of the quantitative behavioral signals across two or more temporally distinct execution rounds; and (v) termination is performed without probabilistic stopping policies or stopping policies that are updated, retrained, or learned during execution of the probabilistic inference processes; and (vi) any elapsed-time limit, iteration limit, or resource exhaustion condition, if present, operates as a safety stopping condition and is not the sole controlling predicate for inhibiting issuance of additional execution commands independent of satisfaction of the termination condition based on the quantitative behavioral signals;

and (vii) the persistence window defines an evaluation interval spanning at least two temporally distinct execution rounds within which the quantitative behavioral signals are evaluated as a deterministic function across execution rounds, wherein the persistence window duration is not a sufficient independent predicate for inhibiting issuance of additional execution commands absent satisfaction of the termination condition based on the quantitative behavioral signals, and the persistence window does not itself define a termination point; and (viii) termination is determined by satisfaction of the stabilization condition based on the quantitative behavioral signals and not by elapsed time, iteration count, resource exhaustion, semantic agreement, confidence, probability estimation, or correctness of inference outputs.

2. The system of claim 1, wherein inhibition of additional execution commands upon satisfaction of the termination condition occurs without requiring approval, confirmation, or acceptance by the probabilistic inference processes.

3. The system of claim 1, wherein semantic agreement, probabilistic confidence, correctness assessment, or model-declared completion does not alter or suppress transition of the deterministic controller to the terminal state once the termination condition based on the quantitative behavioral signals is satisfied.

4. The system of claim 1, wherein, when semantic, probabilistic, or confidence-related signals are computed during execution, satisfaction of the termination condition does not require satisfaction of the semantic, probabilistic, or confidence-related signals.

5. The system of claim 1, wherein the deterministic controller is implemented external to the scheduling, task-queue, invocation-routing, or execution-management component and communicates a termination control signal to that component, the termination control signal causing inhibition of additional execution commands.

6. The system of claim 1, wherein the computing resources released or deallocated in response to satisfaction of the termination condition comprise resources that are reserved or allocated for subsequent execution rounds, and wherein termination prevents further scheduling, invocation, or tool execution for the subsequent execution rounds and releases reserved execution resources.

7. The system of claim 1, wherein the quantitative behavioral signals comprise a plurality of distinct quantitative behavioral signals.

8. The system of claim 1, wherein the quantitative behavioral signals are derived from execution graphs or invocation paths and comprise a measure of structure change computed as a normalized difference between execution graphs or invocation paths observed in successive execution rounds.

9. The system of claim 1, wherein termination occurs in the presence of persistent disagreement, divergence, or bounded oscillation of the quantitative behavioral signals derived from execution telemetry across the persistence window, and wherein the termination condition is satisfied notwithstanding instability of the quantitative behavioral signals across the persistence window.

10. The system of claim 1, wherein upon satisfaction of the termination condition the deterministic controller permits, disables, gates, or delays downstream execution actions associated with the input context.

11. The system of claim 1, wherein the deterministic controller is positioned within the execution dispatch path such that the probabilistic inference processes cannot initiate downstream execution actions without being subject to denial of issuance at the execution dispatch path, and wherein the deterministic controller governs execution sequencing of the probabilistic inference processes across the plurality of execution rounds such that each execution round is initiated under control of the deterministic controller and execution occurs only under authorization of the deterministic controller.

12. The system of claim 1, wherein inhibiting issuance of additional execution commands deterministically constrains execution growth and resource consumption by releasing reserved execution resources and preventing further tool execution associated with the input context.

13. The system of claim 1, wherein the termination condition prevents execution of further execution rounds after the quantitative behavioral signals exhibit relative change within the predetermined bounded conditions across the persistence window.

14. The system of claim 1, wherein evaluation of the stabilization condition across the persistence window comprises a deterministic measure of relative change, bounded invariance, or persistence of the quantitative behavioral signals across the persistence window.

15. The system of claim 1, wherein the deterministic controller operates as a deterministic finite state machine comprising at least initialization, executing, evaluating, and terminated states, and wherein state transitions are deterministic functions of stored quantitative behavioral signals and prior controller state.

16. The system of claim 1, wherein omission of the quantitative behavioral signals would result in materially different processor execution behavior.

17. The system of claim 1, wherein evaluation of the termination condition comprises detecting persistence, bounded invariance, or bounded oscillation of the quantitative behavioral signals across the persistence window, including sustained oscillation or persistent incompatibility of the quantitative behavioral signals.

18. The system of claim 1, wherein inhibition of execution commands prevents scheduling of additional inference processes regardless of any semantic agreement, semantic convergence, probabilistic confidence, correctness evaluation, or model-generated judgment.

19. The system of claim 1, wherein the scheduling, task-queue, invocation-routing, or execution-management component denies issuance of an execution command at the execution dispatch path responsive to a termination control signal, a deterministic-controller state transition indicating inhibition, or a deterministic controller state indicating inhibition, such that the execution command is not issued regardless of any probabilistic inference process output.

20. The system of claim 1, wherein inhibition of additional execution commands prevents issuance of execution commands for tool operations or downstream execution actions initiated by or associated with the probabilistic inference processes.

21. The system of claim 1, wherein the quantitative behavioral signals are evaluated for stabilization across execution rounds that include at least one predetermined execution perturbation selected from a predetermined set and applied during execution of the probabilistic inference processes, the predetermined execution perturbation comprising adversarial role reassignment, constraint modification, or objective variation, and wherein the stabilization condition requires persistence of the quantitative behavioral signals notwithstanding the predetermined execution perturbation.

22. The system of claim 1, wherein the one or more probabilistic inference processes comprise an adversarial or role-differentiated inference process comprising a plurality of execution rounds of one or more probabilistic inference processes operating under adversarially differentiated roles, objectives, or constraints in response to the input context.

23. The system of claim 1, wherein, upon transition to the terminal state, the system persists a decision-space artifact comprising execution-round identifiers, quantitative behavioral signal values, controller state transitions, and a terminal outcome, wherein the decision-space artifact is sufficient to support deterministic replay or audit of the termination decision without re-executing the one or more probabilistic inference processes, and wherein the decision-space artifact further includes representations of differences, compatibilities, or persistence among outputs generated by the probabilistic inference processes during respective execution rounds, the representations being stored for purposes including replay, audit, or inspection and not used as an input to evaluation of the stabilization condition or determination of the termination condition.

24. The system of claim 1, wherein non-semantic execution behavior comprises one or more of execution timing, control-flow variation, retry behavior, branching behavior, execution variance across execution rounds, resource utilization of the one or more probabilistic inference processes, or tool-invocation structure.

25. The system of claim 1, wherein the quantitative behavioral signals are computed without reference to semantic content of inference outputs, semantic similarity, embeddings, confidence scoring, probability estimation, or any derivative thereof, and without reference to any signal that varies as a function of semantic, syntactic, or lexical content of inference outputs.

26. The system of claim 1, wherein the quantitative behavioral signals are derived exclusively from non-semantic execution behavior comprising one or more of execution timing, control-flow variation, retry behavior, branching behavior, execution variance across execution rounds, resource utilization of the one or more probabilistic inference processes, or tool-invocation structure, and are not derived from semantic content, embeddings, confidence scores, probability estimates, or any derivative thereof.

27. The system of claim 1, wherein termination alters subsequent machine operation of the one or more processors rather than producing advisory information for evaluation by the probabilistic inference processes.

28. The system of claim 1, wherein the stabilization condition comprises satisfaction of predetermined bounded conditions by one or more quantitative behavioral signals across the persistence window, wherein the predetermined bounded conditions encompass bounded oscillation or persistent incompatibility of the quantitative behavioral signals.

29. A computer-implemented method, comprising:

(a) initiating scheduling of one or more probabilistic inference processes configured to execute across a plurality of execution rounds including two or more temporally distinct execution rounds in response to an input context;

(b) observing machine-observable execution telemetry comprising machine-observable execution characteristics including execution timing, control-flow variation, retry behavior, branching behavior, execution variance across execution rounds, resource utilization of the one or more probabilistic inference processes, or tool-invocation structure generated during execution of the probabilistic inference processes, the machine-observable execution characteristics being independent of semantic content of inference outputs;

(c) computing, by a deterministic controller implemented as a deterministic state machine, the deterministic controller comprising logic executable by one or more processors, and integrated within or operatively coupled to an execution dispatch path that issues, schedules, queues, routes, or initiates processor execution commands for inference invocations or tool executions, including a scheduling, task-queue, invocation-routing, or execution-management component such that execution commands associated with the one or more probabilistic inference processes cannot be issued without authorization by the deterministic controller prior to issuance, and without interpreting semantic content of inference outputs, one or more quantitative behavioral signals, each comprising a numerical or categorical measure derived exclusively from the machine-observable execution telemetry, wherein the numerical or categorical measure comprises one or more of: (i) an aggregate statistic across the execution rounds; (ii) a normalized difference between execution-round observations; (iii) a structural measure of control-flow or tool-invocation variation across execution rounds; or (iv) any other deterministic measure or direct measurement derived exclusively from the machine-observable execution telemetry observed during one or more of the execution rounds;

(d) evaluating, using predetermined deterministic evaluation rules established prior to execution of the probabilistic inference processes and applied consistently across execution rounds, the predetermined deterministic evaluation rules comprising static configuration data remaining fixed for a duration of processing the input context and not updated, retrained, or modified during execution of the probabilistic inference processes for the input context, whether the termination condition is satisfied based solely on the quantitative behavioral signals, wherein satisfaction of the termination condition is determined by controller state transitions derived from the quantitative behavioral signals evaluated under the predetermined deterministic evaluation rules and is a sufficient controlling predicate for a transition of the deterministic controller to the terminal state and inhibiting issuance of additional execution commands, and updating a deterministic controller state as a deterministic function of the quantitative behavioral signals across the execution rounds, wherein the deterministic controller state controls whether execution commands are permitted for continued execution or termination of the probabilistic inference processes for the input context;

(e) upon satisfaction of the termination condition, transitioning the deterministic controller to the terminal state and directly inhibiting issuance of additional execution commands by denying, at the execution dispatch path, scheduling, invocation, or execution of additional execution commands that would otherwise schedule, invoke, or execute further probabilistic inference processes or associated tool operations, wherein inhibition occurs without requiring evaluation, acceptance, or execution by the probabilistic inference processes as a prerequisite to inhibition, and wherein inhibition of issuance of additional execution commands is performed in response to the deterministic controller state transition or a deterministic controller state indicating inhibition and not in response to an independent termination determination performed by the scheduling, task-queue, invocation-routing, or execution-management component, and wherein issuance of execution commands is denied at the execution dispatch path upon satisfaction of the termination condition such that scheduling or invocation of additional inference invocations is prevented; and (f) in response to satisfaction of the termination condition, releasing or deallocating computing resources allocated for subsequent execution rounds of the probabilistic inference processes;

wherein:

(i) suppression of additional execution commands alters processor execution flow rather than generating advisory termination information;

(ii) identical quantitative behavioral signals evaluated under identical predetermined deterministic evaluation rules yield identical termination outcomes independent of stochastic variation within the probabilistic inference processes, and identical quantitative behavioral signals evaluated under identical predetermined deterministic evaluation rules and identical prior deterministic controller states yield identical subsequent deterministic controller states and identical termination outcomes; and (iii) determination of the termination condition is independent of semantic agreement, semantic convergence, probabilistic confidence, correctness evaluation, or model-generated judgments regarding sufficiency of inference outputs;

(iv) a stabilization condition based on persistence or bounded invariance of the quantitative behavioral signals within predetermined bounded conditions, the predetermined bounded conditions being stored as configuration parameters prior to execution, across a persistence window is treated as a sufficient terminating condition independent of improvement, convergence, agreement, or correctness of inference outputs, wherein the stabilization condition indicates, under the predetermined deterministic evaluation rules, that execution behavior has stabilized within the predetermined bounded conditions, and wherein the termination condition requires persistence of the quantitative behavioral signals across two or more temporally distinct execution rounds; and (v) termination is performed without probabilistic stopping policies or stopping policies that are updated, retrained, or learned during execution of the probabilistic inference processes; and (vi) any elapsed-time limit, iteration limit, or resource exhaustion condition, if present, operates as a safety stopping condition and is not the sole controlling predicate for inhibiting issuance of additional execution commands independent of satisfaction of the termination condition based on the quantitative behavioral signals; and (vii) the persistence window defines an evaluation interval spanning at least two temporally distinct execution rounds within which the quantitative behavioral signals are evaluated as a deterministic function across execution rounds, wherein the persistence window duration is not a sufficient independent predicate for inhibiting issuance of additional execution commands absent satisfaction of the termination condition based on the quantitative behavioral signals, and the persistence window does not itself define a termination point;

and (viii) termination is determined by satisfaction of the stabilization condition based on the quantitative behavioral signals and not by elapsed time, iteration count, resource exhaustion, semantic agreement, confidence, probability estimation, or correctness of inference outputs.

30. A non-transitory computer-readable medium storing instructions that, when executed by one or more processors, cause performance of the method of claim 29.

* * * * *